Figure 1:
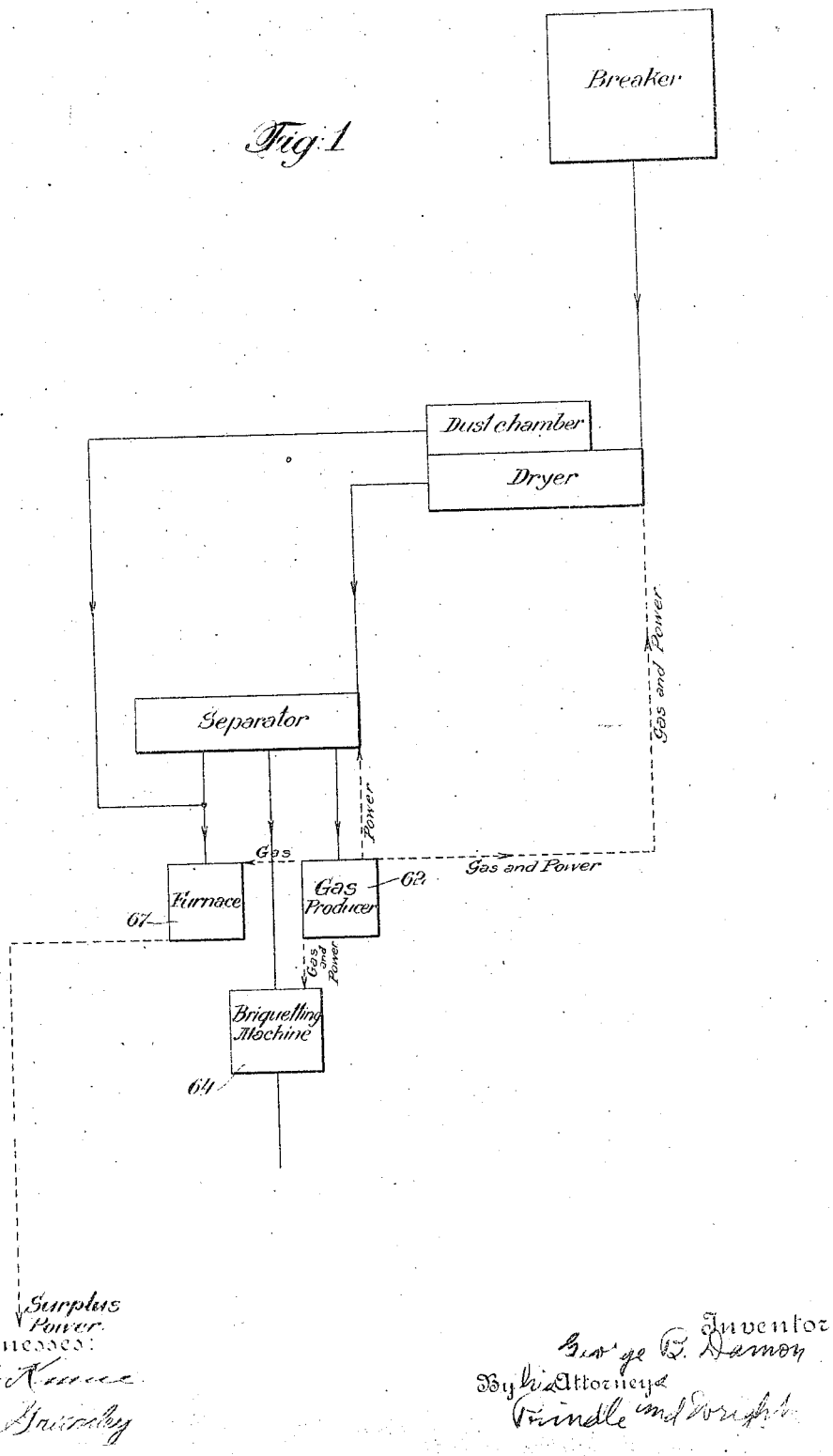

G. B. DAMON.
PROCESS OF BRIQUETING COAL AND THE WASTE MATERIALS THEREOF.
APPLICATION FILED SEPT. 3, 1908.

914,248.

Patented Mar. 2, 1909.
10 SHEETS—SHEET 1.

G. B. DAMON.
PROCESS OF BRIQUETING COAL AND THE WASTE MATERIALS THEREOF.
APPLICATION FILED SEPT. 3, 1908.
914,248.
Patented Mar. 2, 1909.
10 SHEETS—SHEET 2.
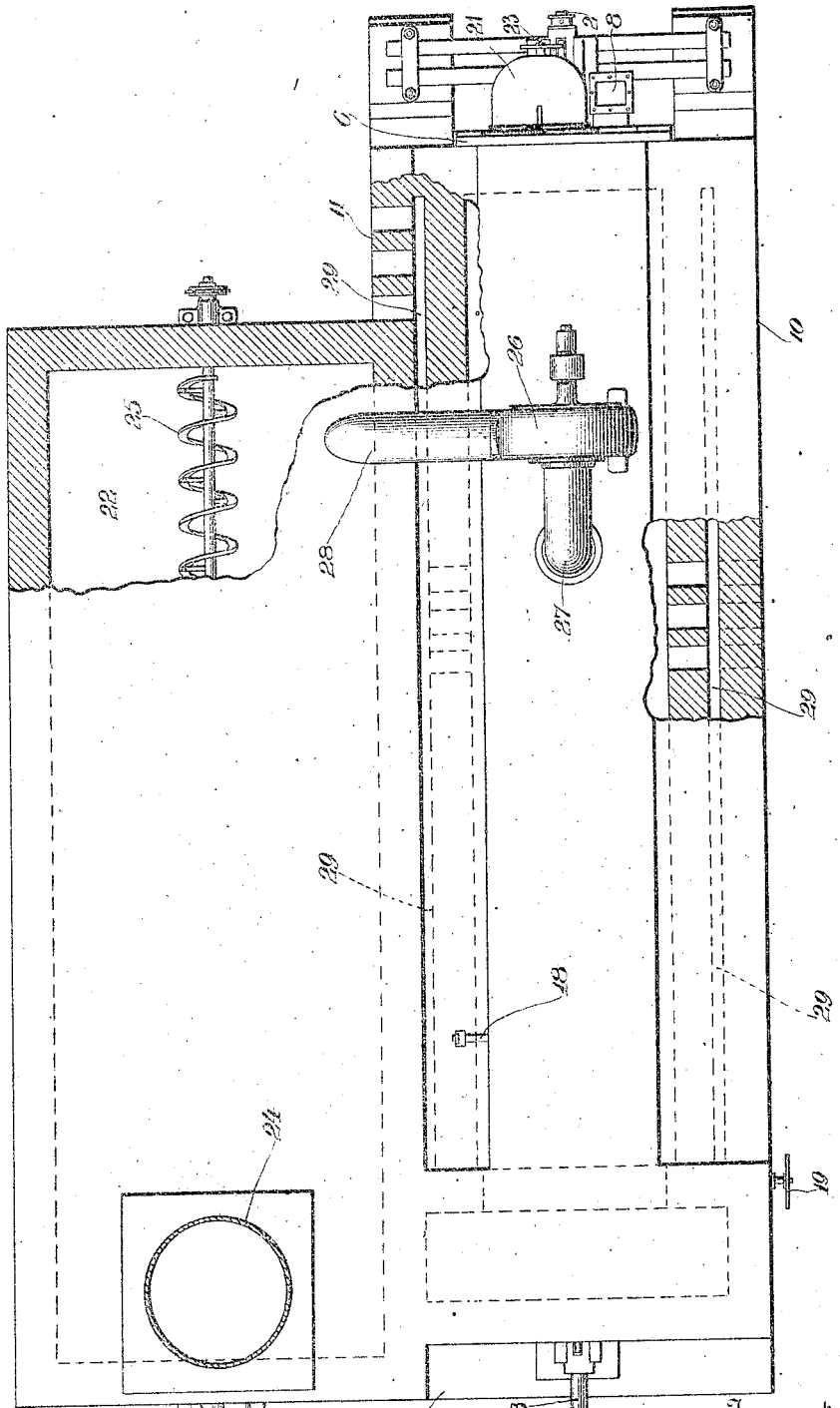

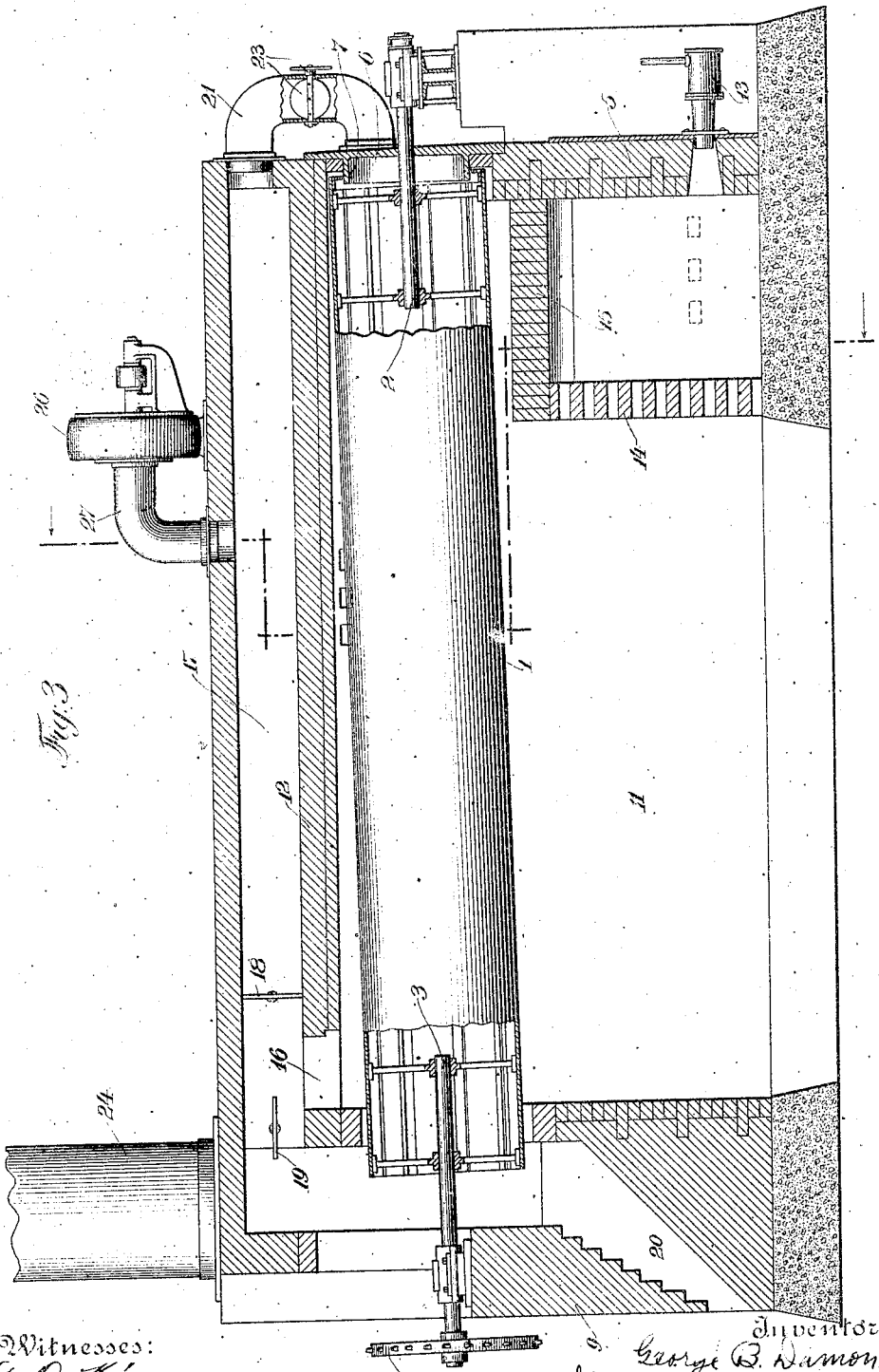

G. B. DAMON.
PROCESS OF BRIQUETING COAL AND THE WASTE MATERIALS THEREOF.
APPLICATION FILED SEPT. 3, 1908.
914,248.
Patented Mar. 2, 1909.
10 SHEETS—SHEET 4.
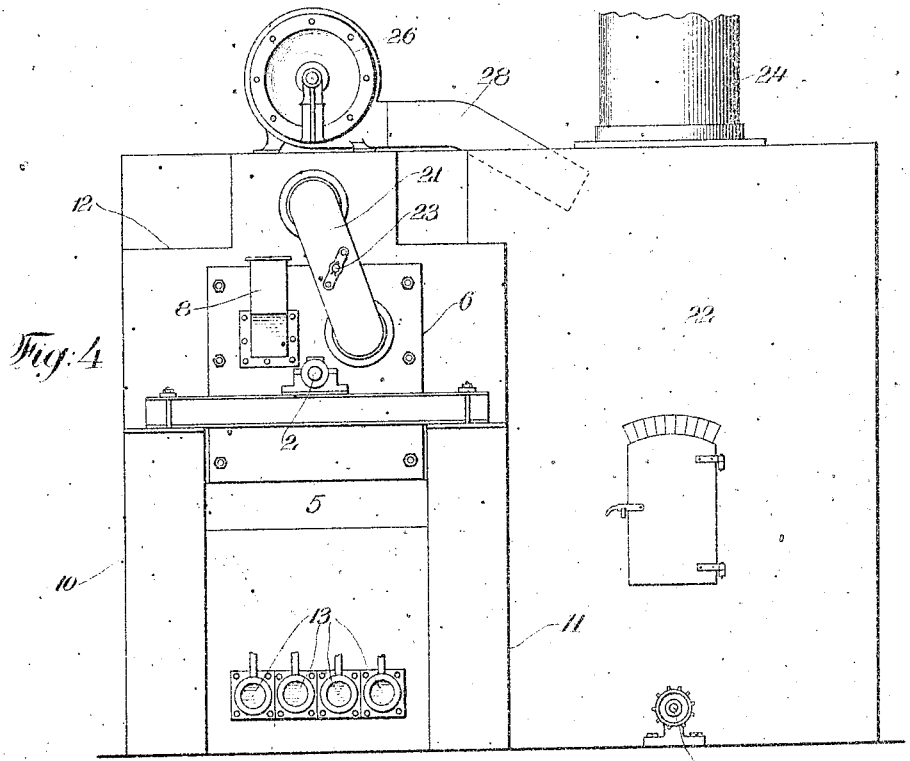
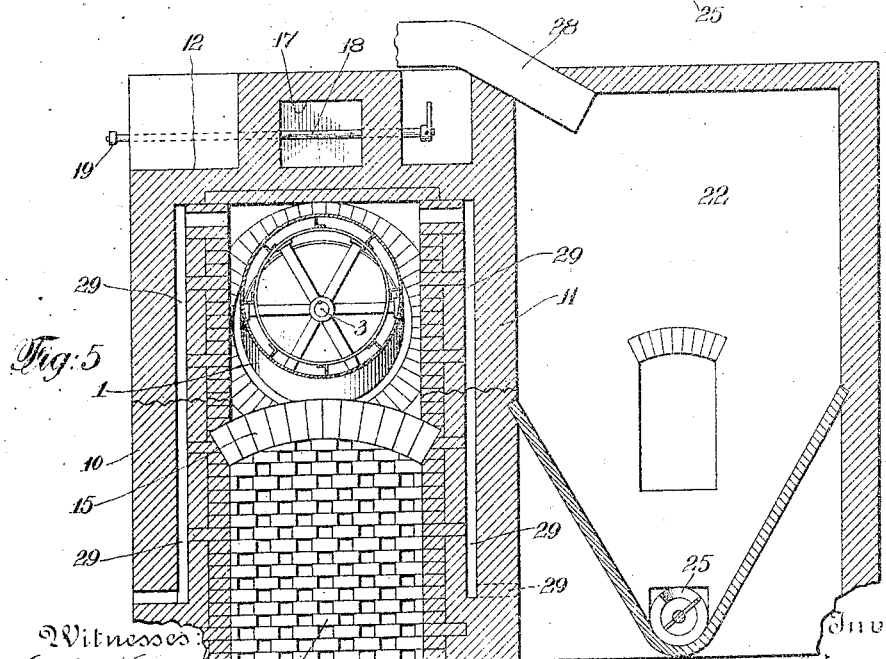

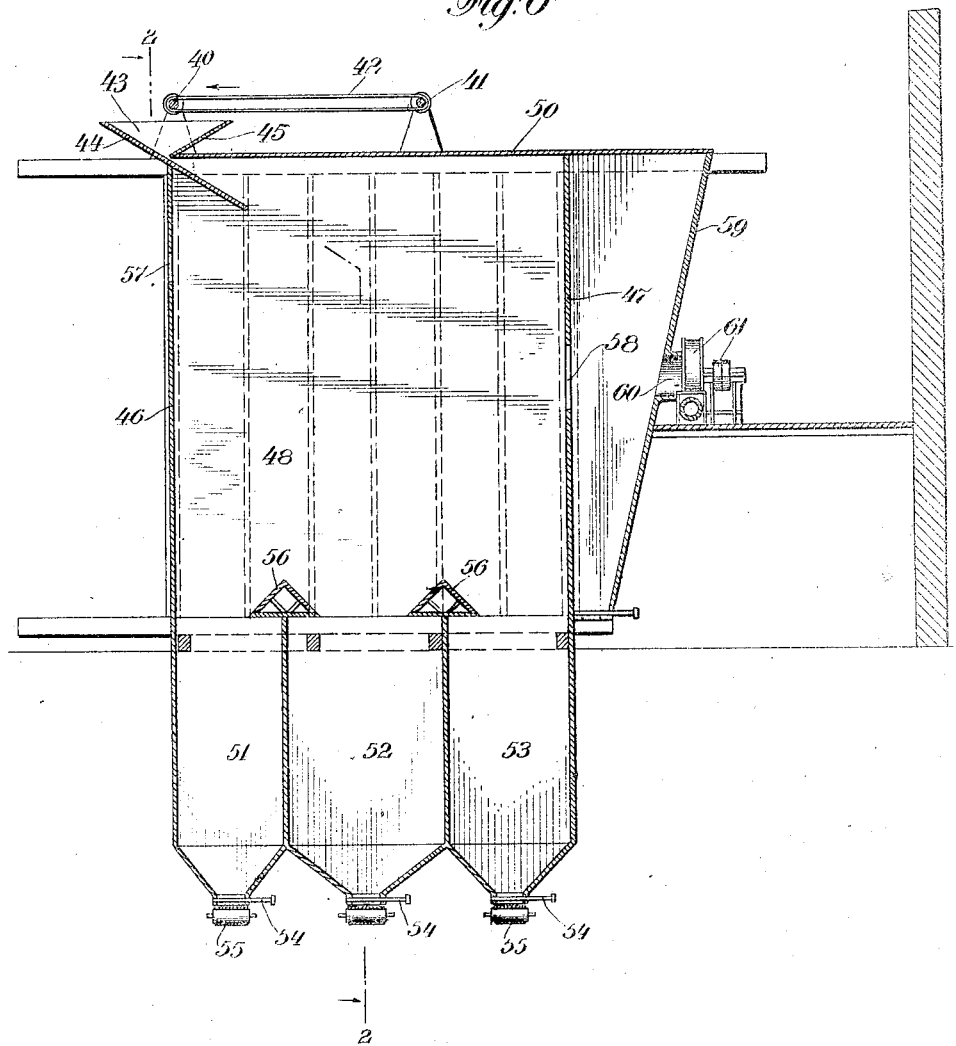

G. B. DAMON.
PROCESS OF BRIQUETING COAL AND THE WASTE MATERIALS THEREOF.
APPLICATION FILED SEPT. 3, 1908.
914,248.
Patented Mar. 2, 1909.
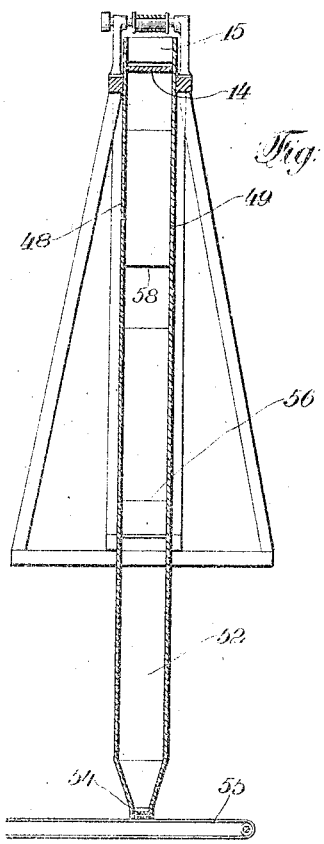
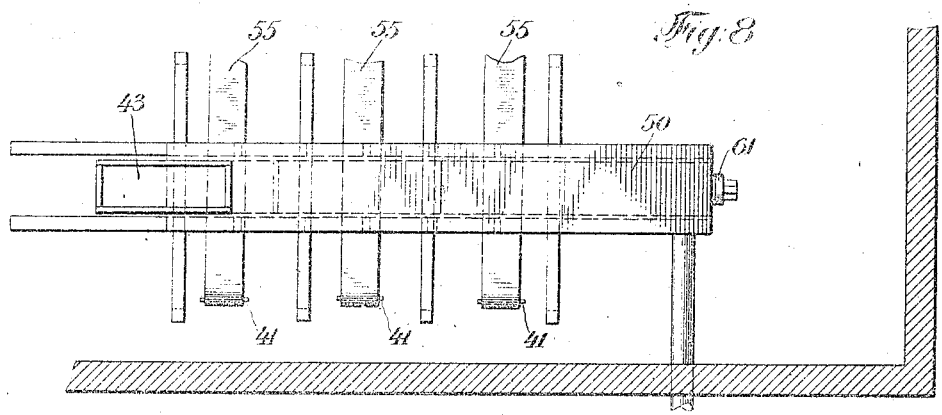

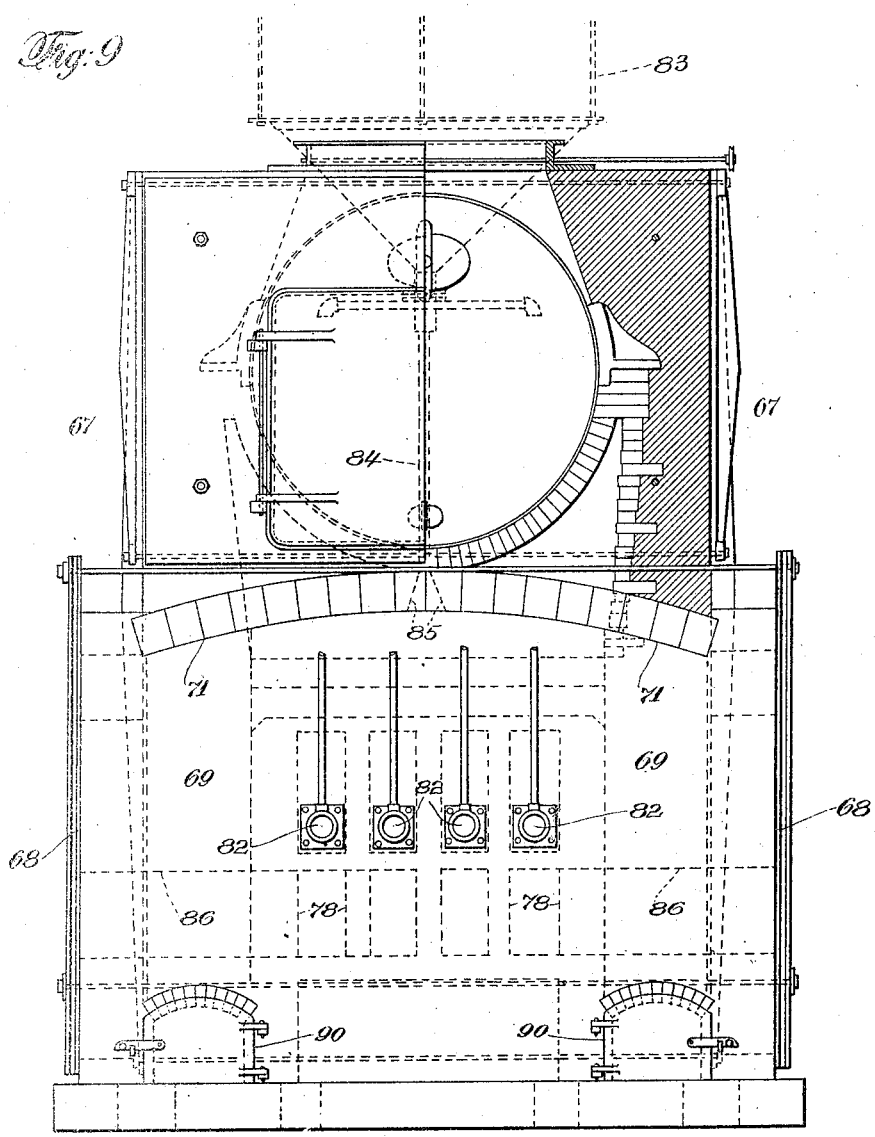

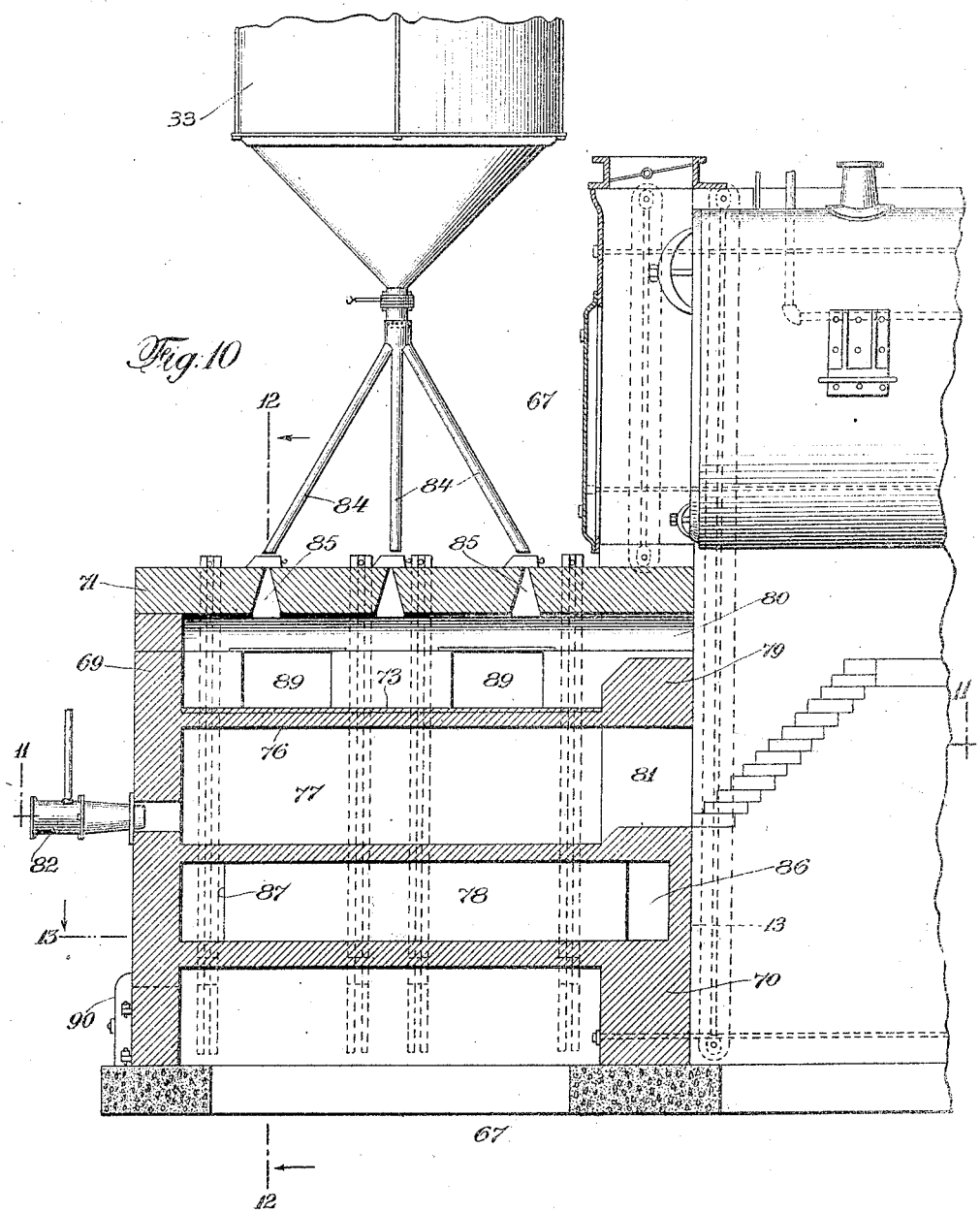

G. B. DAMON.
PROCESS OF BRIQUETING COAL AND THE WASTE MATERIALS THEREOF.
APPLICATION FILED SEPT. 3, 1908.
914,248.
Patented Mar. 2, 1909.
10 SHEETS—SHEET 9.
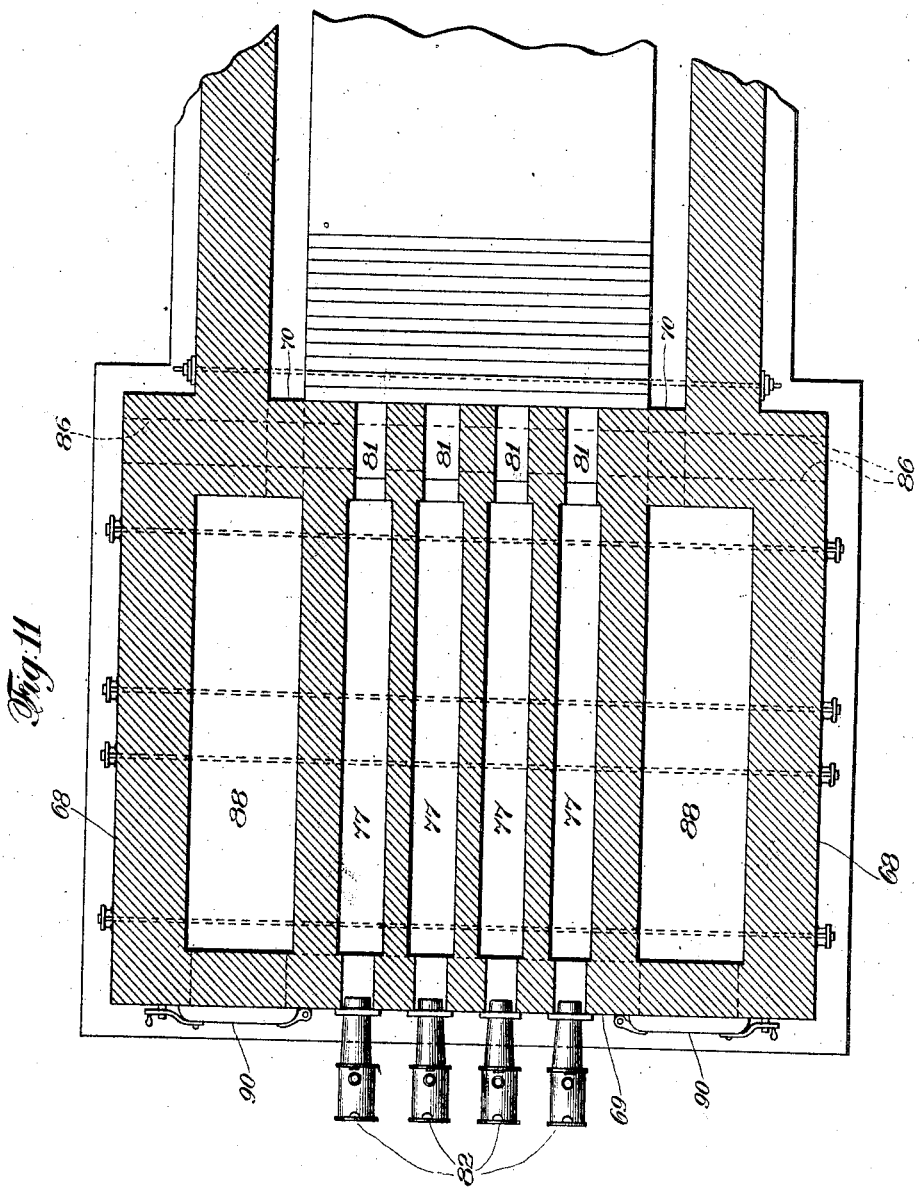

G. B. DAMON.
PROCESS OF BRIQUETING COAL AND THE WASTE MATERIALS THEREOF.
APPLICATION FILED SEPT. 3, 1908.
914,248.
Patented Mar. 2, 1909.
10 SHEETS—SHEET 10.
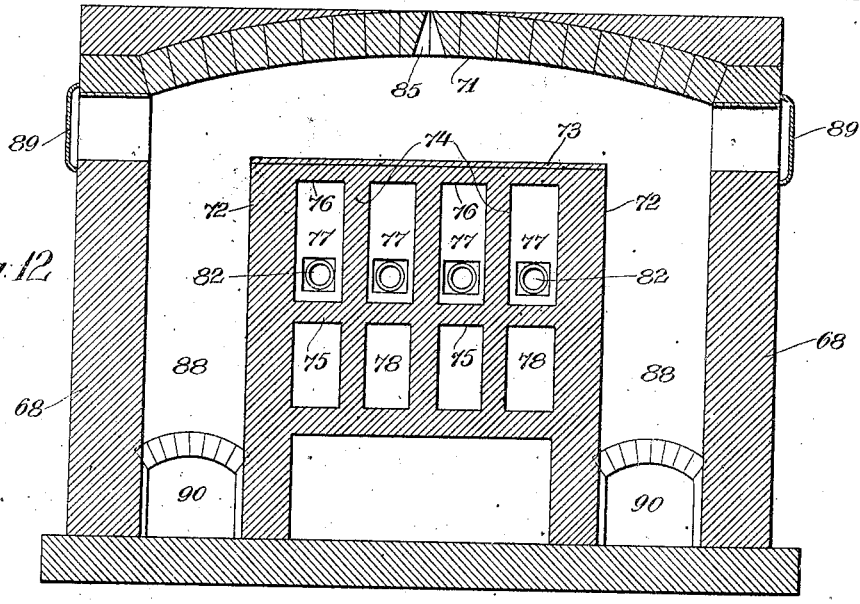
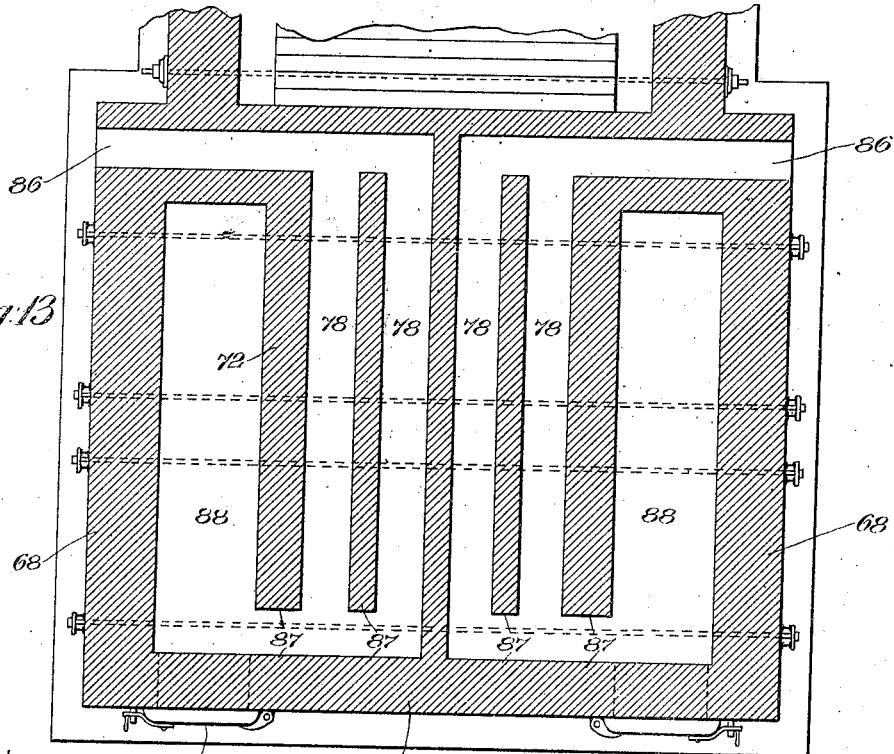

UNITED STATES PATENT OFFICE.

GEORGE BERNHARDT DAMON, OF GLENSIDE, PENNSYLVANIA.

PROCESS OF BRIQUETING COAL AND THE WASTE MATERIALS THEREOF.

No. 914,248.          Specification of Letters Patent.          Patented March 2, 1909.

Application filed September 3, 1908. Serial No. 451,619.

*To all whom it may concern:*

Be it known that I, GEORGE B. DAMON, of Glenside, in the county of Montgomery, and in the State of Pennsylvania, have invented a certain new and useful Improvement in Processes of Briqueting Coal and the Waste Materials Thereof, and do hereby declare that the following is a full, clear, and exact description thereof.
The object of my invention has been to provide a process of preparing for briqueting and briqueting fine anthracite and bituminous coal, and anthracite and bituminous waste materials, which shall have among others the advantages hereinafter stated. By "fine" anthracite coal, I mean coal not substantially larger than "buckwheat," and by "fine" bituminous coal, I mean coal of a size not larger than "buckwheat" in anthracite coal.

Among the advantages are: That of operating upon such materials in a dry condition. That of both operating upon such materials in a dry condition, and being continuous and uninterrupted in its operating on them. That of not requiring any washing at any stage of the process. That of utilizing substantially all the carbon in the said materials. That of being self-supporting, or not requiring that heat be supplied from any other source than the material being treated. That of not only deriving all the heat and power for my process from the waste materials of the process, but of also supplying power from such materials for purposes not connected with briqueting; and to such ends my invention consists in the process of briqueting coal and the waste materials thereof hereinafter specified.
In the accompanying drawings Figure 1 is a diagrammatic view, showing apparatus suitable for the practice of my said process; Figs. 2 and 3 are, respectively, a side elevation, and a vertical sectional view of a drier adapted for use in the said apparatus. Fig. 4 is a front view of the drier; Fig. 5 is a transverse sectional view of the said drier; Figs. 6, 7 and 8 are respectively a vertical longitudinal sectional view, a vertical transverse sectional view, and a plan view of the separator adapted for use with my apparatus; Fig. 9 is a front elevation, partly broken away, of a furnace adapted for use with my said apparatus; Fig. 10 is a vertical longitudinal sectional view of said furnace and the boiler to which it is applied; Figs. 11, 12 and 13 are views taken on the corresponding numbered section lines of Fig. 10.

In the production of anthracite coal, the coal is mined in as large lumps as possible, and is then passed through a breaker to break it up into smaller sizes and to assort and clean the coal. This results in the production of a considerable percentage of coal that is too small for satisfactory sale, because of the competition of bituminous coal. By my process, this small coal can be crushed down to a suitable size for briqueting; its particles can be assorted as to size, its dust removed and the percentage of incombustible material can be reduced, if necessary, and the useful material can then be briqueted. The mining of anthracite coal also results in the production of a large amount of material containing dust and coal too small for satisfactory combustion by the ordinary processes. This material is known as "culm." The culm is too high in incombustible material for satisfactory combustion by the ordinary apparatus. It is also too fine to burn satisfactorily on a grate. I desire by my process to make briquets from culm which shall burn substantially as well as the domestic sizes of coal.

In order to produce satisfactory briquets from culm, it is not only necessary that the percentage of incombustible material should be reduced, but that the particles below a certain size should be removed, because the amount of pitch necessary to bind the particles into a briquet is proportionately larger for small particles than for large particles, as the amount of pitch necessary to coat a small particle is proportionately larger than to coat a large particle. Pitch is expensive, and it is, therefore, not economical to make briquets of material that is too fine. Therefore, another object of my invention has been to remove the dust which is too fine for use in briquets.

It is also desirable that the particles of a briquet shall be of substantially uniform size, because this is necessary to secure satisfactory combustion of the briquet under ordinary circumstances. The larger particles will necessarily burn more slowly than the smaller particles, if the particles be of different sizes, and therefore the combustion will progress from the outer surface of the briquet toward the center in an uneven manner, and this uneven combustion will ordinarily result in smoke. If the particles are of substantially uniform size, the combustion will progress evenly, and there will be a minimum of smoke. Therefore, another object of my invention has been to so assort the particles that the briquets may be made of particles of substantially uniform size.

In the production of bituminous coal, there is much material which is so small that it cannot be satisfactorily gasified nor be burned on grates, and there is waste material which is undesirably high in incombustibles. It is also desirable to be able to reduce the percentage of sulfur and pyrites in bituminous coal to render it more salable for metallurgical purposes. By means of my process, the fine material can be successfully briqueted and the percentage of incombustibles and of sulfur and pyrites can be reduced. The percentage of sulfur and pyrites can be reduced in bituminous coal of any size by crushing it down, if necessary, and subjecting it to my process. While my process is capable of employment upon all of the beforestated materials, I have chosen to illustrate it by its application to culm, because in such application its advantages most completely appear. My process is capable of employment by the use of different forms of apparatus, and with variations in the order of steps. The particular procedure, even with culm is therefore to be taken as merely illustrative of the principle of my process, and the apparatus illustrated is to be taken as merely illustrative of one of many forms of apparatus by which it might be practiced.

The culm is carried from the breaker by currents of water flowing through what are known as "chutes", and is therefore saturated with water. In preparation for my process, the culm is received from the slush chutes in cars and permitted to stand therein until all of the water which will drain is drained out. Thus, the moisture which has to be driven off by heat is reduced to a minimum. The first step of the process is the drying of the culm to drive off the remainder of the moisture. This may be accomplished in any form of drier.

That form of drier which I have chosen for illustration is as follows: The drier comprises a cylinder mounted in an inclined position in a casing, the cylinder being rotated upon its axis. The material to be dried is fed into the upper end of the cylinder and travels through the cylinder, owing to the inclination and the rotation of the latter, and is heated and dried during its passage through the cylinder. In the accompanying drawings, the cylinder 1 has an upper shaft 2 and a lower shaft 3 secured in it by means of spiders, the shaft 2 being mounted in a bearing on a pier at the front of the drier, and the shaft 3 being mounted in a bearing on the rear wall of the drier. The cylinder is prevented from slipping to the left in Fig. 3 by means of a collar on the upper end of the shaft. The shaft 3 is provided with a wheel 4, or other means for rotating it. The front wall 5 of the drier has an opening to receive the end of the cylinder, and a flanged plate 6 closes the opening in the wall, the flange 7 projecting slightly into the cylinder. A chute to receive the culm is fastened to the said plate and opens through the latter. The material to be dried is fed into the open upper end of the chute and passes into the cylinder. The cylinder is inclosed in a chamber formed by the front wall 5, a rear wall 9, side walls 10 and 11, and a top wall 12. A gas burner 13 is mounted in the front wall, and throws its flame rearward through an opening in such wall. The flame is received in a chamber formed by the wall 5, a rear wall 14, the side walls 10 and 11, and an arched top 15. The rear wall 14 is checkered. The gases of combustion, after passing through the checkered wall, pass around the cylinder and escape through an opening 16 in the top wall 12, and thus enter a horizontal passage 17, formed on the said top wall. In the passage 17 there is a damper 18 at the front of the opening 16, and a damper 19 to the rear of such opening. At the rear end of the cylinder a vertical passage is formed in the rear wall, which passage opens at its upper end into the passage 17, and at its lower end is contracted to form a chute 20. At its forward end the passage 17 is connected by a pipe 21 with a dust chamber 22 built preferably at the side of the drier proper. The pipe 21 is provided with a damper 23. The dust chamber has a stack 24 opening through its roof, and is provided with a hopper-shaped bottom; that is, with a bottom formed of inclined sides, and a screw conveyer 25, or other form of conveyer, is mounted in its bottom, suitable gearing being provided for driving the conveyer. A fan 26 has its suction pipe 27 connected with the passage 17 and its delivery pipe 28 connected with the dust chamber. Air spaces 29 are provided in the side walls 10 and 11, which are opened to the outer air at and by ducts at the lower ends, and which communicate with the cylinder chamber by ducts at their upper ends.

In the drying of material by means of the illustrated drier, the material enters the drier through the chute at the forward end, and passes into the cylinder. The heat from the gas burner first reaches the outer side of the cylinder and then passes up through the opening 16 under suction of the fan. If it is desired to have the gases pass through the cylinder, the damper 18 is closed, and the damper 19 opened, thus causing the gases to pass rearward and downward, and to enter the rear end of the cylinder. They thence pass forward and are drawn through the pipe 21 by the suction of the fan, and are forced into the dust chamber. The gases when passing in this manner carry a certain amount of the dust of the material with them into the dust chamber. The dried material falls into the chute 20 and is carried by a conveyer to the separator, which performs the next step in my process. If it is not desired to have the gases pass through the cylinder, the rear damper 19 is closed and the forward damper 18 opened, and the gases pass by means of the passage 17 directly to the fan, and by it are forced into the dust chamber. In this instance, the damper 23 in the pipe 21 would be closed.

While I have illustrated a form of drier which I prefer, there are obviously many other forms of driers which could be used in place of it.

From the chute 20 of the drier, the material passes to a separator which separates the dust and incombustible material of the culm from the portion thereof which is sufficiently rich in carbon, and that is large enough to briquet, and which also properly grades the material as to size. So far as the general process with which the subject of the present application is concerned, said separator may be constructed in any manner, so long as it leaves the culm in a dry condition.

The separator which I have chosen for illustration is one which is the subject of another application for patent, and which is therefore not specifically claimed in the present application. Such separator, as illustrated in Figs. 4, 5 and 6, comprises a framework supporting in its upper portion rollers 40 and 41, over which runs a belt 42, upon which the culm is deposited from the conveyer of the drier. The upper surface of the belt runs toward the left in Fig. 4. Beneath the roller 40, and in position to catch the falling culm, is a hopper 43, having parallel vertical sides, and inclined bottoms 44 and 45. The inclined bottom 45 stands a little above the bottom 44, so that the culm may slide down the latter and beneath the former. The c'lm thus falls from the lower end of the bottom 44 in a uniform stream. The lower end of the bottom 44 extends into a closed chamber, preferably having a width approximately equal to that of the said bottom, and having side walls 46 and 47 parallel to each other, and preferably having a length and height approximately equal. The chamber is closed by front and rear walls 48 and 49, respectively, and by a roof 50. The bottom of the chamber is closed by three bins 51, 52 and 53, respectively, which bins together occupy the entire bottom. Each bin is closed by a "hopper bottom" having in it a sliding door 54, and which door has beneath it a belt 55, that is adapted to carry away the material falling through the door. Over each division wall of the bins, I preferably arrange a movable rider or guard 56. This rider or guard has forwardly and rearwardly inclined upper faces meeting at an apex, and it can be shifted over a division wall between the bins, forward or back, within the limits of the length of its base, thus in effect shifting the division wall between the bins so as to exactly divide the material which is to go into the respective bins. In the front wall 48 is an opening 57, that is preferably well up toward the level of the lower end of the bottom 44. In the rear wall 49 is an opening 58, whose area is larger than the opening 57 in the front wall. I find good results to be obtained by making the rear opening approximately twice the area of the front opening. The height of the rear opening is determined by the special conditions, which will be stated later in describing the operation of the apparatus.

At the rear of the separator chamber proper is a chamber formed by the wall 49, and a partition 59, which, starting at its foot, near the wall 49, preferably extends upward and rearward at a slight inclination to form a hopper-like bottom, the said partition extending to the roof, and the said chamber being closed at the sides by side walls 46 and 47. An opening 60 is formed in the partition 59, approximately opposite the opening 58, and a suction fan 61, or other form of suction apparatus, is connected with said opening to exhaust air from the space inclosed, and thus to draw air through the opening 58. The process which is practiced by the illustrated dry separator is based on the discovery that the finer dust in culm is the part thereof highest in percentage of incombustible material. It has heretofore been believed that the dust in culm was largely pure coal. This process is also based on the further discovery that by means of a current of air, formed by suction produced under certain conditions near a falling stream of culm, I can separate this fine, comparatively incombustible material from the larger, more useful material, and can also assort the larger material to great advantage. In the said separator, the opening between the bottom 45, and the bottom 46, is adjusted to permit a stream of culm of sufficient quantity to pass to make rapid operation possible, but not of sufficient thickness to prevent advantageous action of the air. The suction apparatus being in operation, a strong current of air enters through the opening 57, and striking the falling stream of culm, causes the particles to fall at greater or less distances rearward of the vertical, according to the size and weight of the particles. The bony coal, pyrites, and larger particles of coal fall into the bin 51. The briqueting material, which is high in carbon and not too fine, falls into the bin 52, and the dust and material which is too fine for briqueting, and which contains the incombustible material in the form of powder, falls into the bin 53. The various factors influencing the separating may be stated as follows: The suction causes the air to pass in substantially straight lines from the opening 57 to the opening 58, and an accurate separation of the material, according to the size and specific gravity is effected. I have found that if a blast be forced through the opening 57, instead of a suction drawn through the opening 58, great confusion will occur within the chamber, and efficient separation will not take place. The velocity of the air is adjusted to the size of the coal being treated; the larger the coal, the higher the velocity. If the velocity of the air is too low, it does not sufficiently spread the material. The velocity should also be regulated according to the temperature, to obtain the best results. The partitions between the various bins are located according to the velocity of the air to be used, since it is evident that if the velocity of the air be increased, the material which should fall into the bin 50 will fall into bin 51, and so with the bins 52 and 53. If the culm has incombustible material in comparatively large pieces, the rear rider is moved somewhat to the rear. If the incombustible material in the shape of impalpable powder is present to an unusual extent, the rear rider is moved forward. If a high velocity of the air is required, both riders will be moved rearward, and vice versa. I find it advantageous to place the opening 57, well up toward the level of the bottom 44, because the air in this position strikes the material before it has acquired much velocity, and therefore the material is subjected to the action of the current of air for a longer time than it would be if the opening were lower down. This is of importance, because I find that if the front opening be made too large, a good separation of the carbon and incombustible material is not effected. I find the best results to be obtained by making the area of the rear opening larger than that of the front opening. I also find it is advantageous to locate the rear opening higher or lower, according to the particular conditions. A certain amount of the incombustible dust can be carried through this opening into the chamber in the rear. If the opening be too high, the dust does not pass through it as well as if it be lower. I have also found that if the coal be flaky, it is more easily carried by the air, and it is then an advantage to have the rear opening high; whereas, if the coal be granular, it is with more difficulty carried by the air, and it is more advantageous to have the rear opening low. The coal is flaky or granular according to the wood of which it is formed, and usually the bulk of the material being treated at any one time will all be of the same general character, that is, flaky or granular. A door, of any convenient sort, into the rear chamber is provided, so that the dust may be removed therefrom. While I have indicated the conditions to obtain the best results, a fair result can be obtained notwithstanding many of such conditions are not observed. It will thus be seen that the agents controlling the various conditions are the relative cross-sections and locations of the front and rear openings to each other, and to the bins, the velocity of the air, and the location of the riders.

The bony coal, pyrites, and large particles of coal, falling into the bin 51, are carried by its belt 55 to a gas producer 62, of any desired type. As no particular type of gas producer is required, the gas producer is not illustrated in detail.

The material in the bin 52, which is high in carbon and suitable for briqueting, is carried by the belt 55, of such bin, to the briqueting machine 64, and there briqueted. The briqueting machine may be of any desired type, and as its construction is well known, it is not herein illustrated.

I desire to burn the dust and material high in carbon in the bin 53, and from such combustion, together with the heat from the gas producer, and heat to be obtained from dust separated in the drier, to produce all the heat utilized in the entire process. I therefore convey the material from the bin 53, by its belt 55, and also the material from the dust chamber of the drier, to a furnace 67. Dust does not burn well on a grate. It packs too tightly, and if there be enough pressure of air to supply the air needed for combustion, it "honeycombs" the bed, resulting in too much air passing through in some places and not enough in others, and in blowing the dust through the furnace without burning it. If there be not enough air, it results in a dull, red, smoldering fire. To overcome these objections, I have devised a furnace which I am about to describe and which is the subject of a separate application for patent, executed of even date herewith. The essential feature of my said furnace is that the dust is deposited on a surface preheated to a sufficiently high degree, preferably to incandescence, so that the carbon of the dust unites with the oxygen to form carbonic oxid, and such gas is then burned. I prefer to heat the said surface by gas produced from the said gas producer.

Specifically, my furnace comprises side walls 68, a front wall 69, a rear wall 70, and an arched roof 71. Within said walls are longitudinal, vertical walls 72, which support a comparatively thin plate, bed, or combustion surface 73, that is preferably formed of refractory material, such as silica tile. The said bed is supported at intermediate points by vertical longitudinal partitions 74, which are supported upon a bridge piece 75, somewhat above the level of the ground. Webs 76 connect the partitions 74 at a level intermediate their upper and lower edges, and thus there are formed four upper passages 77, and four lower passages 78, extending longitudinally. At the rear end of the combustion surface is preferably a bridge wall 79, and above it an opening 80 for the escape of gases beneath the boiler. The passages 77 also communicate by openings 81 with the space beneath the boiler. Each passage 77 has at its forward end a burner 82 that is supplied by gas from the gas producer. The coal dust is deposited by the belt 55, of the bin 53, and by a conveyer from the dust chamber of the drier in the hopper 83, and passes from said hopper, as by pipes 84 to openings 85 in the roof 71 above the combustion surface, and the dust is thus deposited upon the combustion surface. Air to burn the carbonic oxid, formed by the heating of the dust upon the combustion surface, enters the furnace by openings 86, at the sides, and passes to the forward ends of the passageways 78. It here divides, and passing through said passageways, reaches the forward end of the furnace, it having been heated by passing beneath the floor formed by the webs 76, which form the bottoms of the combustion chambers. The air at the forward end of the furnace enters lateral passageways 87, and thus reaches vertical spaces 88 between the walls 72, and the side walls 68. In this manner the air rises to, and passes over the combustion surface, and there, in its preheated condition, combines with the carbonic oxid of the culm dust. In order that the incombustible material may be scraped off the combustion surface, doors 89 are provided in the side walls of the furnace to give access to such surface. The ashes thus formed fall through the passageways 88, and are removed at the bottom through doors 90. In the operation of the said furnace, the burners fed by the producer gas, heat the combustion plate preferably at least to a red heat and preferably to incandescence. These gases pass under the boiler and serve to heat it. The culm is deposited on the combustion surface, preferably in a thin layer and is there quickly heated, and its carbonic oxid liberated. The carbonic oxid unites with the air which has been preheated by passing through the passages beneath and round the chambers 77, in which the producer gas is burned, and thus highly efficient combustion of the carbonic oxid occurs. The gases from this combustion pass beneath the boiler. By the use of the said furnace, the dust from the bin 53, of the separator and from the drier is burned under beneficial conditions, and this together with the gas of the gas producer, produces not only sufficient heat and power for all purposes of my apparatus, but also produces a surplus of power. Thus the dust, which is a waste material and which is a large percentage of the entire bulk of the culm, is rendered useful, and serves a purpose which would otherwise require the valuable coal or briquets.

The gas from the producer is not only used to supply direct heat by combustion for my furnace, and to heat the drier, the pitch-melting apparatus, the briqueting machine, and the preheater and mixer of the latter, but it may also supply energy by combustion in internal combustion engines to the rotary drier, to the separator, to the briqueting apparatus, elevators, conveyers, etc., and also preheats the surface on which the dust is burned.

With my process it is not necessary either to dry the culm when wet with an excess of water, such as would be present if it were just taken from a wet separator, or to handle it and store it while waiting for such excess to drain off.

No fuel from any outside source needs to be supplied to practice my process. All of the useful material is utilized (that which is large enough so as not to require an excessive quantity of pitch to briquet it), and yet all the heat and power required are produced by burning carbon in the waste material which is either too fine to be briqueted, or in the bony coal and very large particles.

While I have illustrated the procedure which affords the best results from my process, there are many variations which can be made without seriously impairing the result, and it is obvious that equivalents can be substituted for various of the steps therein. I therefore desire not to be limited beyond the requirements of the prior art and the necessary intendment of my claims.

The apparatus illustrated herein is not claimed in the present application, but is the subject of separate applications for patent. The process of separating coal and waste materials is likewise the subject of a separate application for patent, and the process of burning the dust, and other fine material is the subject of a separate application or patent.

I claim:

1. The process of briqueting fine coal and the waste material of coal, comprising first substantially drying the material, then separating the incombustibles, and then briqueting the remaining material.

2. The process of briqueting culm, comprising first substantially drying the culm, then separating the incombustibles, and then briqueting the remaining material.

3. The process of briqueting fine coal and the waste materials thereof, comprising first substantially drying the material, then separating the dust from the material, and then briqueting remaining material suitable in size.

4. The process of briqueting culm, comprising first substantially drying the culm, then separating the dust from the culm, and then briqueting remaining material suitable in size.

5. The process of briqueting fine coal and the waste materials thereof, comprising first substantially drying the material, and then, without subsequently wetting the material, separating the incombustible material and briqueting the remainder suitable in size.

6. The process of briqueting culm, comprising first substantially drying the culm, and then without subsequently wetting the culm, separating the incombustible material and briqueting the remainder suitable in size.

7. The continuous process of briqueting culm, comprising substantially drying the culm, separating the dust and larger material from the culm, briqueting the remainder thereof suitable in size, and utilizing the heat of combustion of the larger material to dry the incoming culm.

8. The process of briqueting fine coal and the waste material thereof, comprising substantially drying material, separating the dust from the material, and briqueting the latter material suitable for briqueting without intermediate drying.

9. The process of briqueting culm, comprising substantially drying the material separating the dust from the material suitable for briqueting, and briqueting the latter material without intermediate drying.

10. The process of briqueting fine coal and the waste material thereof, comprising first substantially drying the material, then separating the dust from the material suitable for briqueting, then briqueting the said material, and burning the rejected material to furnish heat for drying and briqueting.

11. The process of briqueting culm, comprising first substantially drying the culm, then separating the dust from the briquetable material, then briqueting the said material, and burning the rejected material to furnish the heat for drying and briqueting.

12. The process of briqueting culm, comprising first substantially drying the culm, then separating the dust and the bony coal from the culm, producing gas from said bony coal, heating a combustion surface by means of said gas, and burning the dust from the separation on such surface.

13. The continuous process of briqueting fine coal and the waste material thereof, comprising first substantially drying the coal, then separating the dust and the larger particles from the briquetable material, briqueting the said material, producing gas from said larger particles, heating one side of a combustion surface with the gas thus produced, burning said dust on the opposite side of said surface, and conveying the heat thus produced to the drier and briqueting machine for operating upon subsequent portions of the material.

14. The continuous process of briqueting culm, comprising first substantially drying the culm, then separating the dust and the bony coal from the culm, briqueting the remainder of the culm, producing gas from the bony coal, heating one side of a combustion surface with the gas thus produced, burning the said dust on the opposite side of said surface, and conveying the heat thus produced to the drier and briqueting machine for operation upon subsequent portions of the culm.

15. The process of briqueting culm, comprising effecting a substantially dry separation of the dust and the coal, and briqueting the coal.

16. The process of briqueting culm, comprising effecting a dry separation of the dust and the coal, and briqueting the portions remaining after the separation of the dust.

17. The process of briqueting culm, comprising drying the culm, effecting a dry separation of the dust and the coal, and briqueting the remainder.

18. The continuous process of briqueting culm, comprising separating the substantially incombustible material from the coal, burning said rejected material, utilizing the heat to dry subsequent portions of culm, and briqueting the briquetable material.

19. The continuous process of briqueting culm, comprising separating the unbriquetable material from the briquetable material, briqueting the briquetable material, burning the unbriquetable material, and drying subsequent portions of culm by the heat thus produced.

20. The continuous process of briqueting fine coal, comprising separating the dust from the coal, burning said dust, separating and briqueting subsequent portions of coal and dust, and utilizing the heat produced from the burning of the dust for such operations.

21. The continuous process of briqueting culm, comprising separating the unbriquetable material from the briquetable material, briqueting said briquetable material, burning said unbriquetable material, drying, separating and briqueting subsequent portions of culm and utilizing the heat produced from the burning of the unbriquetable material for such operations.

22. The continuous process of briqueting culm, comprising separating the dust and the bony coal from the briquetable material, briqueting the briquetable material, burning the dust and gasifying the bony coal, drying, separating and briqueting subsequent portions of the culm, and utilizing the gas and heat produced from the bony coal and dust to supply heat and power for said subsequent operations.

In testimony that I claim the foregoing I have hereunto set my hand.

GEORGE BERNHARDT DAMON.

Witnesses:
T. L. HODGE,
ROBT. V. PIERCE.